UNITED STATES PATENT OFFICE.

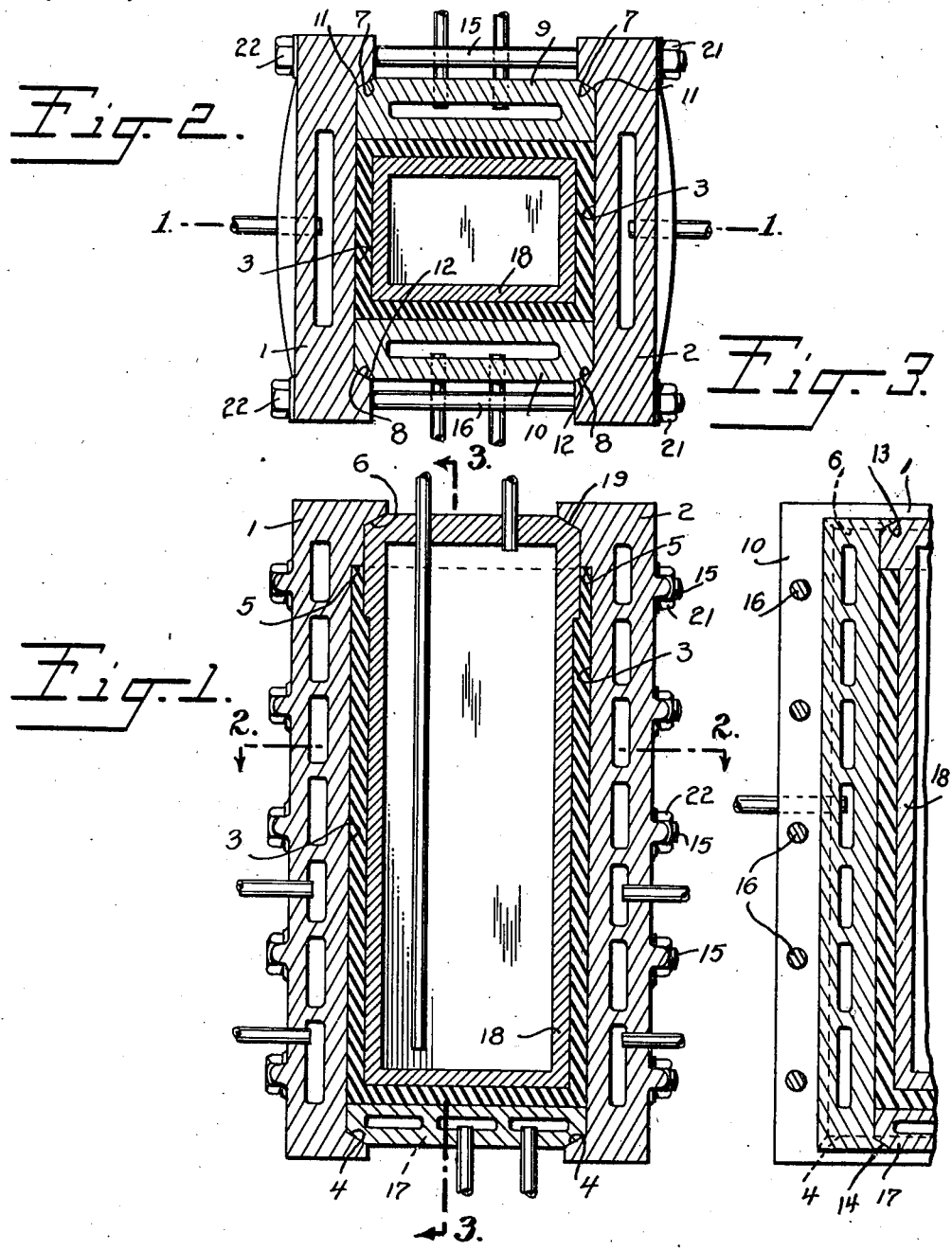

HARRY WEIDA, OF HIGHLAND PARK, NEW JERSEY, ASSIGNOR TO INDIA RUBBER COMPANY, A CORPORATION OF NEW JERSEY.

MOLD FOR PLASTIC MATERIALS.

1,289,983. Specification of Letters Patent. Patented Dec. 31, 1918.

Application filed June 21, 1917. Serial No. 176,025.

*To all whom it may concern:*

Be it known that I, HARRY WEIDA, a citizen of the United States, residing at Highland Park, in the county of Middlesex, State of New Jersey, have invented certain new and useful Improvements in Molds for Plastic Materials, of which the following is a full, clear, and exact description.

This invention relates to molds for plastic materials. It is more particularly directed to a mold for producing vulcanized rubber articles under heat and pressure.

One object of the invention is to provide a mold of the kind described adapted to produce articles particularly hollow articles, having walls free from warping and of uniform thickness and density. Another object is to devise an inexpensive mold of the kind described which may be easily and efficiently operated.

Briefly, the invention consists of a mold, including means to alter the volume of the molding space, comprising an adjustable side wall.

In the accompanying drawing wherein is shown one of the various possible embodiments of the invention, Figure 1 is a longitudinal sectional elevation taken on the line 1, 1 of Fig. 2 showing a mold constituting one embodiment of my invention;

Fig. 2 represents a cross-sectional view taken on the line 2, 2 of Fig. 1, and

Fig. 3 represents a sectional detail view taken on the line 3, 3 of Fig. 1.

Referring now more particularly to the drawings there is shown a hollow mold constituting a closed parallelepiped whose six walls are separable from one another. Each of the opposite parallel side-walls 1 and 2 of the mold is provided with a depressed inner face 3 extending for substantially the entire length of the side walls and terminating adjacent the lower extremity in the horizontal beveled portion 4 and adjacent the upper part in a horizontal shoulder 5 adjoining a horizontal beveled portion 6 similar to the lower portion 4. The depressed face terminates adjacent its lateral edges in vertical beveled portions 7 and 8. The lateral edges of each side-plate overlap the other pair of oppositely disposed side-plates 9 and 10 which complete the four sides of the parallelepiped. Each of the side-plates 9 and 10 is beveled at 11 and 12 constituting its outer vertical edges. Adjacent its upper and lower extremities each of the side-plates 9 and 10 is beveled horizontally as shown at 13 and 14 (see Fig. 3).

At either end of each of side-plates 1 and 2 are bores through which pass respectively bolt members 15 and 16, constituting adjustable members adapted to draw the side-plates 1 and 2 together to contract the volume of the molding space as hereinafter set forth.

As shown in this embodiment a bottom wall 17 is provided whose lower edge is beveled throughout corresponding to the bevels 4 and 14 of the members 1 and 2 and 9 and 10 respectively.

Within the five-sided mold thus constituted a hollow core 18 is placed adapted to provide a ledge in the molded article and having its upper edge 19 beveled throughout to correspond to the bevels 6 and 13 respectively of the side walls 1 and 2 and 9 and 10. The top of the core, it will be noted, when in its usual position constitutes a closure over the top of the mold thus constituting the mold a closed parallelepiped. It will be noted in this connection that if desired the closure effected by the top of the core and by the bottom plate 17 may be replaced by the plates in the ordinary type of hydraulic press.

Each of the bolts 15 and 16 is provided with adjusting nuts 21 and 22 whereby the adjustment of the members 1 and 2 may be effected. Plates 1, 2, 9, 10 and 17 are provided as shown with ducts through which fluid at a vulcanizing temperature may be circulated. The core 18 is also provided with means for circulating a fluid at a vulcanizing temperature therethrough.

In operating the embodiment shown, the walls etc. are assembled and a quantity of hard rubber or other vulcanizable plastic composition is placed therein. The nuts on bolts 15 and 16 are tightened and the walls 1 and 2 are drawn together. Simultaneously with this movement the beveled portions 7 and 8 of walls 1 and 2 coact with beveled portions 11 and 12 of the side-walls 9 and 10, beveled portions 4 and 6 coact with beveled portions 13 and 14 and all of the walls of the mold move uniformly inwardly in substantially right lines, compressing the plastic material substantially equally in all directions. When the desired pressure on the plastic material has been secured adjustment is stopped and steam at a vulcanizing temperature is applied to the mold. At the end of the vulcanizing period the bolts are released and the article removed from the mold.

The article produced, here shown as a battery jar has clear-cut edges and unwarped faces of uniform thickness and density.

As many apparently widely different embodiments of this invention may be made without departing from the spirit thereof, it is to be understood that I do not intend to limit myself to the specific form of the invention as set forth except as indicated in the appended claims.

Having thus described my invention what I claim and desire to protect by Letters Patent is:—

1. A mold comprising movable walls which when assembled inclose a rectangular mold cavity, the said walls being provided with contacting beveled faces, and means including the said beveled faces whereby all of the walls may be simultaneously moved toward each other to reduce the capacity of the mold cavity without varying its form.

2. A mold comprising side walls, a bottom wall and a core and means for positively moving opposed side walls toward each other, all of the said members being so adapted that the movement of the opposed side walls will actuate the core and bottom wall to reduce the distance between them.

3. A mold comprising side walls, a bottom wall and a core, all of the said members being provided with intercontacting beveled faces, a device for adjusting oppositely disposed side walls to force them together and thereby cause the said beveled faces to act upon the remaining side walls, bottom wall and core to simultaneously move all of the said members toward each other to decrease the area of the molding space.

4. A hollow mold constituting a closed parallelepiped, one pair of opposite sidewalls having beveled inner surfaces and overlapping the ends of the second pair of opposite side-walls, said second pair of side-walls being provided with corresponding beveled surfaces, adjustable members passing between the overlapping portions of the first-mentioned side-walls, a bottom wall provided with beveled surfaces, beveled surfaces on the lower part of the first-mentioned side-walls corresponding thereto a core within the mold provided with a beveled top closing the top of the mold, beveled portions on the upper part of the side-walls corresponding to the beveled portions of the top of said core, and a device for adjusting the adjustable members to force the first-mentioned wall together thereby simultaneously causing the beveled portions thereon to contact with the corresponding beveled portions on the other walls including the bottom and core and to decrease the volume of the molding space.

Signed at New Brunswick in the county of Middlesex, State of New Jersey, this 18th day of June, 1917.

HARRY WEIDA.